(12) United States Patent
Journade et al.

(10) Patent No.: US 11,187,189 B2
(45) Date of Patent: Nov. 30, 2021

(54) AIRCRAFT PROPULSION SYSTEM COMPRISING A MOBILE ARTICULATED COWL

(71) Applicant: Airbus Operations (S.A.S.), Toulouse (FR)

(72) Inventors: Frédéric Journade, Toulouse (FR); Pierre Charon, Toulouse (FR); Laurent Cazeaux, Tournefeuille (FR); Pascal Gougeon, Bouloc (FR)

(73) Assignee: Airbus Operations (S.A.S.), Toulouse (FR)

( * ) Notice: Subject to any disclaimer, the term of this patent is extended or adjusted under 35 U.S.C. 154(b) by 149 days.

(21) Appl. No.: 16/695,820

(22) Filed: Nov. 26, 2019

(65) Prior Publication Data
US 2020/0182194 A1    Jun. 11, 2020

(30) Foreign Application Priority Data
Nov. 30, 2018   (FR) ...................................... 1872156

(51) Int. Cl.
*F02K 1/72*    (2006.01)
*F02K 1/76*    (2006.01)

(52) U.S. Cl.
CPC ................ *F02K 1/72* (2013.01); *F02K 1/766* (2013.01)

(58) Field of Classification Search
CPC .................................... F02K 1/72; F02K 1/766
See application file for complete search history.

(56) References Cited

U.S. PATENT DOCUMENTS

| 6,151,883 A | 11/2000 | Hatrick et al. |
| 7,559,507 B2 * | 7/2009 | Harrison .................... F02K 1/72 244/110 B |
| 8,627,644 B2 * | 1/2014 | Vauchel .................... F02K 1/72 60/226.2 |
| 9,366,201 B2 * | 6/2016 | Caruel .................... F02K 1/763 |
| 9,759,158 B2 | 9/2017 | Marshall |

(Continued)

FOREIGN PATENT DOCUMENTS

EP    2 725 218 A2    4/2014
FR    2 750 168 A1    12/1997

OTHER PUBLICATIONS

French Search Report for Application No. 1872156 dated Aug. 8, 2019.

*Primary Examiner* — Lorne E Meade
(74) *Attorney, Agent, or Firm* — Jenkins, Wilson, Taylor & Hunt, P.A.

(57) ABSTRACT

A propulsion system includes a bypass turbine engine and a pylon. The turbine engine includes an engine, two internal cowls, two outer cowls, a first lock for locking the internal cowls to the engine, cascades of vanes fixed to the outer cowl via hooping, wherein the outer cowls are movable in translation with respect to the engine, in which each outer cowl is able to slide parallel to a direction of translation on an internal cowl via a top guideway connection and a bottom guideway connection, and in which each outer cowl is mounted with the ability to slide parallel to the direction of translation on the pylon via an upper guideway connection. The propulsion system makes it possible during maintenance operations to move the outer cowl and the internal fixed structure towards the rear and therefore away from the front cowls to get at the engine.

11 Claims, 5 Drawing Sheets

(56) References Cited

U.S. PATENT DOCUMENTS

| | | | |
|---|---|---|---|
| 9,783,315 B2 * | 10/2017 | James | B64D 29/08 |
| 2013/0277454 A1 | 10/2013 | Hurlin et al. | |
| 2016/0201600 A1 | 7/2016 | Charron et al. | |

\* cited by examiner

AIRCRAFT PROPULSION SYSTEM COMPRISING A MOBILE ARTICULATED COWL

CROSS-REFERENCE TO RELATED APPLICATION

This application claims priority to French patent application 18 72156 filed on Nov. 30, 2018, the entire disclosure of which is incorporated by reference herein.

TECHNICAL FIELD

The disclosure herein relates to an aircraft propulsion system comprising a mobile articulated cowl, to a method for placing such a propulsion system in the maintenance position, and to an aircraft comprising at least one such propulsion system.

BACKGROUND

An aircraft conventionally comprises at least one propulsion system which comprises an engine forming a core around which an internal fixed structure (also referred as IFS) surrounding the engine, and outer cowls arranged around the internal fixed structure, are arranged.

During maintenance operations on the propulsion system it is necessary to open the outer cowls in order to access the engine. However, because access is often limited and does not permit certain operations that require manipulations, it is then necessary to remove the outer cowls to set them down on the ground in order to be able to also remove the internal fixed structure and thus gain access to the engine.

Such operations are relatively lengthy and painstaking because parts that are relatively heavy need to be removed and moved around.

SUMMARY

It is an object of the disclosure herein to propose an aircraft propulsion system which comprises a mobile articulated outer cowl which can be moved in translation with the internal fixed structure for the purposes of maintenance operations.

To this end, the subject matter herein discloses a propulsion system for an aircraft comprising a bypass turbine engine and a pylon, in which the bypass turbine engine comprises an engine with a fan, two internal cowls surrounding the engine, a fan case and two outer cowls surrounding the internal cowls to define a secondary flow path and positioned to the rear of the fan case, in which the turbine engine comprises first locking or first lock which can alternately adopt a locked position in which the first lock locks the internal cowls of the engine and an unlocked position in which they release the internal cowls of the engine, in which the outer cowls are able to move in translation with respect to the engine between a forward position in which the outer cowls are against the rear of the fan case and a retracted position in which the two outer cowls are distant from the fan case to open up a window between the secondary flow path and the outside, in which the bypass turbine engine further comprises, for each outer cowl, at least one door mounted with the ability to rotate on the outer cowl between a non-obstructing position in which the door is not across the secondary flow path and a deployed position in which the door is across the secondary flow path in order to divert the flow of air towards the window, in which the bypass turbine engine further comprises cascades of vanes which are fixed to the outer cowl via hooping which may alternately adopt a hooping position in which they lock the cascades of vanes to the outer cowl and a disengaged position in which they release the cascades of vanes from the outer cowl, in which each outer cowl is mounted with the ability to slide parallel to a direction of translation on the corresponding internal cowl via a top guideway connection and a bottom guideway connection and in which each outer cowl is mounted with the ability to slide parallel to the direction of translation on the pylon via an upper guideway connection, in which the upper guideway connection comprises, on the one hand, a beam having a slot and, on the other hand, at least one slider secured to the outer cowl which slides in the slot and at least one slider secured to the cascades of vanes which slides in the slot, in which the beam is fixed to the pylon via a pivot connection about an axis of rotation parallel to the direction of translation allowing the outer cowl to move between a closed position in which the outer cowl is closed up around the engine and an open position in which the outer cowl is distant from the engine.

Such a propulsion system thus makes it possible, during maintenance operations, to move the outer cowl and the internal fixed structure towards the rear and therefore away from the front cowls in order to get at the engine.

Advantageously, the fan case is made up of two fan cowls, each one being fixed to the pylon via a pivot connection pivoting about the axis of rotation allowing each fan cowl to move between the closed position and the open position, the first lock comprises, on the one hand, a slot which is open towards the outside, which extends around the engine and which is secured thereto and, on the other hand, for each internal cowl, a rib secured to the internal cowl which is housed in the slot in the locked position and which comes out of the slot in the unlocked position, the hooping comprises, on the one hand, a slot which is open towards the outside, which extends around the engine and which is secured to the outer cowl and, on the other hand, for each cascade of vanes, a rib secured to the cascade of vanes which is housed in the slot in the hooping position and comes out of the slot in the disengaged position, and the connection between each slider of the outer cowl and the slot is a sliding pivot connection.

Advantageously, the propulsion system comprises a first mechanical transmission system at the upper guideway connection and a first mechanical transmission system at the bottom guideway connection with a beam constituting part of the internal cowl and a slider constituting part of the outer cowl.

Advantageously, the beam of the upper guideway connection and the beam of the bottom guideway connection each comprise an opening which extends parallel to the direction of translation, each first mechanical transmission system comprises:

a first series of coils aligned one after the other in the direction of translation,
a second series of coils aligned one after the other in the direction of translation, in which the first series of coils and the second series of coils are housed in the opening,
a strip which is incorporated into the slider, which extends in the direction of translation and which is made up of a succession of permanent magnets aligned one after the other in the direction of translation, in which the permanent magnets are arranged between the first series and the second series of coils, in which two consecutive permanent magnets have their north pole facing alternately towards the first series of coils and towards the second series of coils, a position sensor configured to sense the position of the slider in the direction of translation, an electrical power supply to power the coils, and a control unit configured to control the electrical power supply according to the information delivered by the position sensor so as to power only those coils that are facing a permanent magnet, and the first mechanical transmission system of the upper guideway connection comprises a blocking system which can alternately adopt a blocking position in which the blocking system blocks the two series of coils, and a release position in which the blocking system does not block the two series of coils.

Advantageously, the blocking system comprises deformable runners positioned between a series of coils and the beam, and a pressurizer arranged on the opposite side to the deformable runners against the other series of coils and able alternately to adopt a pressing position in which they press against the other series of coils, in order to compress the deformable runners, or a relaxed position in which they do not press on the other series of coils, so as to relax the deformable runners.

The subject matter herein also discloses a method for placing the propulsion system according to one of the above alternative forms in a maintenance position, consisting in or comprising:

moving the fan cowl and the outer cowl from the closed position into the open position by rotation about the axis of rotation, bringing with them the cascades of vanes and the internal cowl, and unlocking the first lock, moving the outer cowl about the axis of excursion in order to dislodge the rib of the cascade of vanes from the slot in the outer cowl, and moving the outer cowl and the internal cowl towards the rear while the cascades of vanes remain in position.

The subject matter herein also discloses an aircraft comprising at least one propulsion system according to one of the preceding alternative forms.

BRIEF DESCRIPTION OF THE DRAWINGS

The abovementioned features of the disclosure herein, together with others, will become more clearly apparent from reading the following description of an example embodiment, the description being given with reference to the attached drawings among which.

DETAILED DESCRIPTION

In the description which follows, terms relating to a position are considered with reference to the direction of forward travel of an aircraft.

Figure 1:
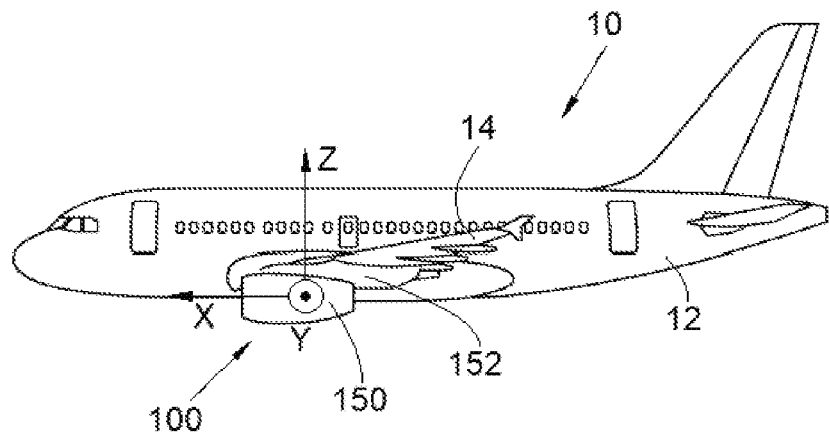
FIG. 1 is a side view of an aircraft according to the disclosure herein.

FIG. 1 shows an aircraft 10 which comprises a fuselage 12, on each side of which is attached a wing 14 which bears at least one propulsion system 100 comprising a bypass turbine engine 150 and a pylon 152 which attaches the bypass turbine engine 150 under the wing 14.

In the description which follows and by convention, the longitudinal axis of the bypass turbine engine 150 which is parallel to the longitudinal axis of the aircraft 10 and oriented positively toward the front of the aircraft 10 is referred as to as X, the transverse axis which is horizontal when the aircraft 10 is on the ground is referred to as Y, and the axis which is vertical when the aircraft 10 is on the ground is referred to as Z, these axes X, Y and Z being mutually orthogonal.

Figure 2:
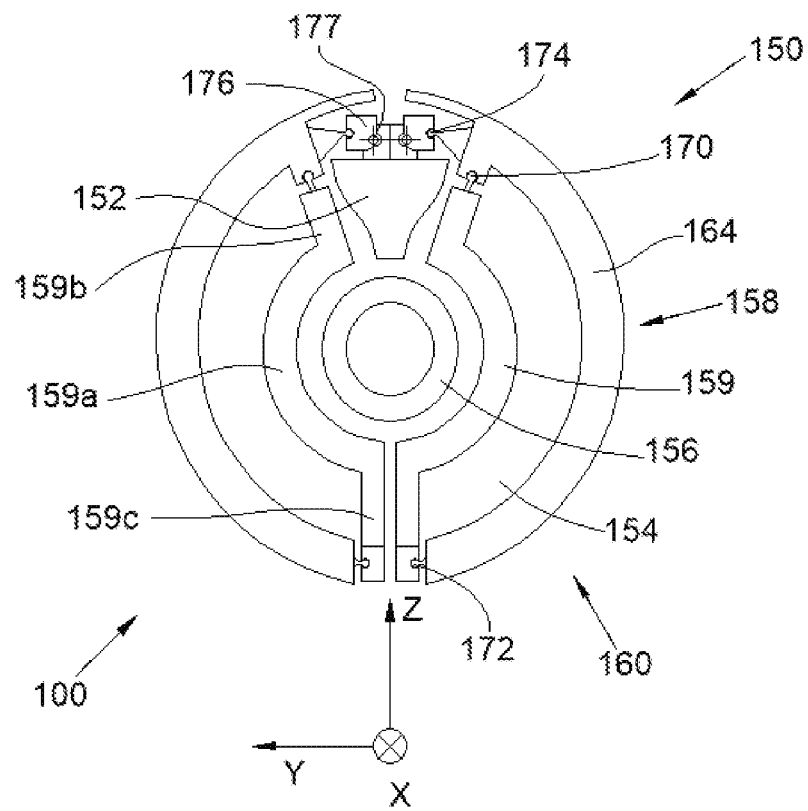
FIG. 2 is a front view schematic depiction of a propulsion system according to the disclosure herein.
Figure 3:
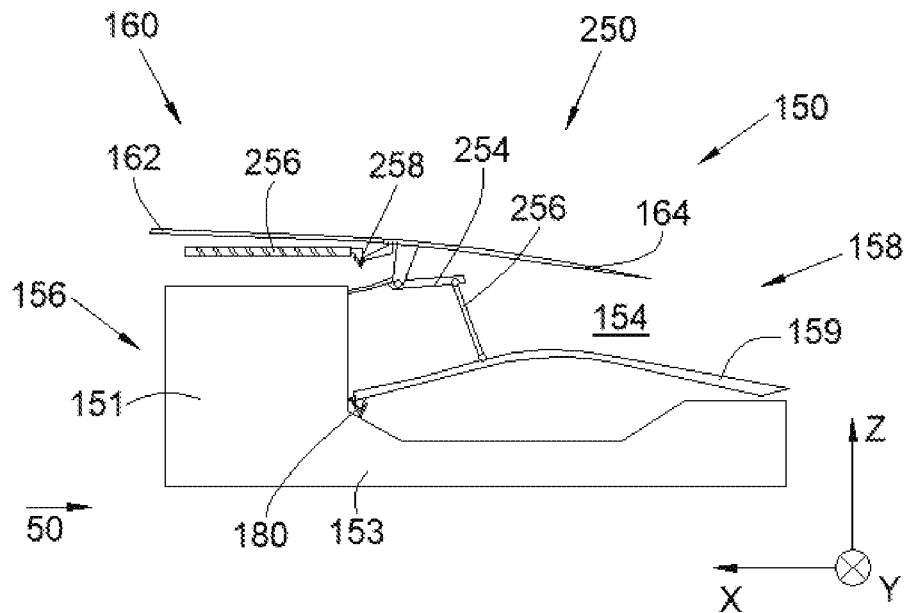
FIG. 3 is a side view, in cross section, of a turbine engine of the propulsion system according to the disclosure herein, in a forward position.

FIG. 2 schematically shows the propulsion system 100 which comprises the bypass turbine engine 150 and the pylon 152, and FIG. 3 shows a schematic side view of the bypass turbine engine 150.

The turbine engine 150 comprises an engine 156 with a fan 151 intended to generate a flow of air through the turbine engine 150 in a direction of travel 50 of the air through the turbine engine 150, in which, in a known way, the air flow then travels downstream of the fan 151 partly through a primary flow path 153 of the turbine engine 150 and partly in a secondary flow path 154 of the turbine engine 150.

The engine 156 forms a core through which the air from the primary flow path 153 circulates and which comprises, in series, an engine compressor, a combustion chamber and an engine turbine. The fan 151 is at the front of the engine 156.

The engine 156 is surrounded by an internal fixed structure 158 (also referred to as IFS) which internally delimits or defines the secondary flow path 154. The internal fixed structure 158 is made up of two internal cowls 159 arranged one on each side of the mid plane XZ of the turbine engine 150. Each internal cowl 159 here comprises a central part 159a adopting the shape of a half-cylinder the axis of which is the longitudinal axis X, and two extensions 159b-c. Each extension 159 b-c takes the overall shape of a plate where each extends in a plane parallel overall to the mid plane XZ. The upper extension 159b extends upwards from the upper edge of the central part 159a and the lower extension 159c extends downwards from the lower edge of the central part 159a.

In the position of operation of the turbine engine 150, the internal fixed structure 158, namely the internal cowls 159, are fixed with respect to the engine 156, and in the maintenance position the internal fixed structure 158, which means to say the internal cowls 159, are released with respect to the engine 156. For that purpose, the turbine engine 150 comprises lock 180 which can alternately adopt a locked position in which lock 180 locks the internal cowls 159 to the engine 156, and an unlocked position in which lock 180 releases the internal cowls 159 from the engine 156.

The turbine engine 150 also comprises a nacelle 160 which surrounds the internal fixed structure 158 and which comprises a fan case 162 around the fan 151 and two outer cowls 164 arranged around the internal fixed structure 158, namely around the internal cowls 159. The outer cowls 164 are likewise positioned one on each side of the mid plane XZ of the turbine engine 150. Each outer cowl 164 sits around one of the internal cowls 159.

The fan case 162 is fixed and at the front of the nacelle 160 whereas each outer cowl 164 is to the rear of the fan case 162 and able to move in translation in a direction of translation parallel overall to the longitudinal axis X. The fan case 162 is also made up of two fan cowls positioned one on each side of the mid plane XZ of the turbine engine 150.

Figure 4:
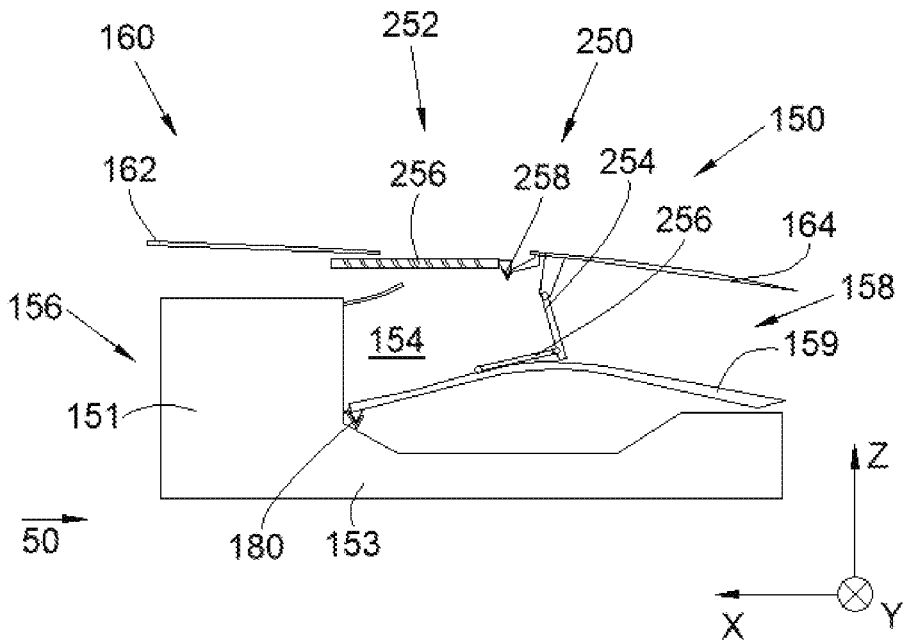
FIG. 4 is a view similar to that of FIG. 3, in a retracted position.

FIG. 3 shows the turbine engine 150 with the outer cowls 164 in a forward position, and FIG. 4 shows the turbine engine 150 with the outer cowls 164 in a retracted position. The outer cowls 164 externally delimit or define the secondary flow path 154.

Each outer cowl 164 is mounted with the ability to slide parallel to the direction of translation on the corresponding internal cowl 159 via a top guideway connection 170 and a bottom guideway connection 172. The top guideway connection 172 is arranged in the top part of the turbine engine 150 and the bottom guideway connection 172 is arranged in the bottom part of the turbine engine 150. The top guideway connection 170 and the bottom guideway connection 172 are embodied by any suitable structure such as, for example, a slot in one of the parts that are the outer cowl 164 and the internal cowl 159 and a slider secured to the other of the parts that are the internal cowl 159 and the outer cowl 164 and which slides in the slot. In the disclosure herein embodiment proposed here, the top guideway connection 170 and the bottom guideway connection 172 are more particularly implemented at the upper extension 159*b* and the lower extension 159*c*.

Each outer cowl 164 is also mounted with the ability to slide parallel to the direction of translation on the pylon 152 via an upper guideway connection 174 likewise arranged in the top part of the turbine engine 150.

The upper guideway connection 174 comprises, on the one hand, a beam 176 having a slot and, on the other hand, at least one slider secured to the outer cowl 164 which slides in the slot.

The beam 176 is fixed to the pylon 152 via a pivot connection pivoting about an axis of rotation 177 parallel overall to the direction of translation and therefore here to the longitudinal axis X, thus forming a hinge allowing the outer cowl 164 to move between a closed position in which the outer cowl 164 is closed up around the engine 156 and an open position in which the outer cowl 164 is distant from the engine 156, bringing the corresponding internal cowl 159 with it.

In the closed position, the two outer cowls 164 are closed up to form aerodynamic continuity with the fan case 162.

The turbine engine 150 also comprises a reverser system 250.

The reverser system 250 comprises the outer cowls 164 which are able to move in translation with respect to the engine 156 between a forward position and a retracted position. In the forward position, the outer cowls 164 are held against the rear of the fan case 162, and in the retracted position, the two outer cowls 164 are distant from the fan case 162 in order to open a window 252 between the secondary flow path 154 and the outside. The window 252 is delimited or defined at the front by the fan case 162 and at the rear by the outer cowls 164, as can be seen in FIG. 4.

In order to move each outer cowl 164 from the forward position to the retracted position, the turbine engine 150 comprises a first mechanical transmission system which comprises for example actuators such as jacks, motors, racks and which is controlled by a control unit of the aircraft 10. To ensure correct movement of the outer cowl 164 it is preferable to provide a first mechanical transmission system at the bottom guideway connection 172 and one at the upper guideway connection 174.

For each outer cowl 164, the reverser system 250 also comprises at least one door 254 which is mounted with the ability to rotate on the outer cowl 164 about an axis perpendicular overall to the longitudinal axis X.

Each door 254 is able to move between a non-obstructing position and a deployed position. In the non-obstructing position (FIG. 3) the door 254 is not across the secondary flow path 154 and therefore does not impede the passage of the stream of air along the secondary flow path 154. In the deployed position (FIG. 4), the door 254 is across the secondary flow path 154 so as to divert the air flow towards the window 252. In this instance, in the deployed position, the door 254 comes up against the internal cowl 159.

For each door 254, the reverser system 250 also comprises a second mechanical transmission system 256 which allows the door 254 to be moved from the non-obstructing position into the deployed position when the outer cowl 164 passes from the forward position to the retracted position. Here, the second mechanical transmission system 256 is a linkage fixed between the door 254 and the internal fixed structure 158, but it could for example comprise actuators such as jacks, motors controlled by the control unit.

In order to increase the deflection of the stream of air leaving via the window 252, the turbine engine 150 comprises cascades of vanes 256 which are fixed to the outer cowl 164 via hooping 258 which may alternately adopt a hooping position in which they lock the cascades of vanes 256 to the outer cowl 164 and a disengaged position in which they release the cascades of vanes 256 from the outer cowl 164.

In the forward position, the cascades of vanes 256 position themselves under the fan case 162 and in the retracted position, the cascades of vanes 256 position themselves across the window 252.

The translational movement of the cascades of vanes 256 between the forward position and the retracted position is also ensured by the upper guideway connection 174 where the cascades of vanes 256 have at least one slider which slides in the slot of the beam 176.

Thus, in the operating position, when the reverser system 250 is activated, the outer cowls 164 and the cascades of vanes 256 are moved towards the retracted position along the top guideway connection 170, the bottom guideway connection 172 and the upper guideway connection 174, causing each door 254 to move towards the deployed position, while the internal cowls 159 remain fixed.

Figure 5:
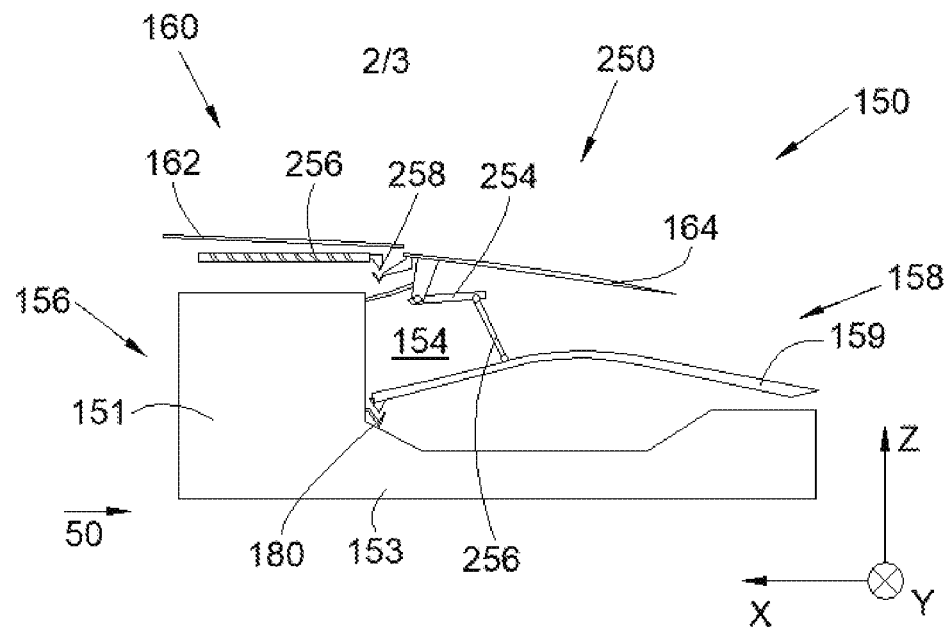
FIG. 5 is a view similar to that of FIG. 3, in an unhooking position.
Figure 6:
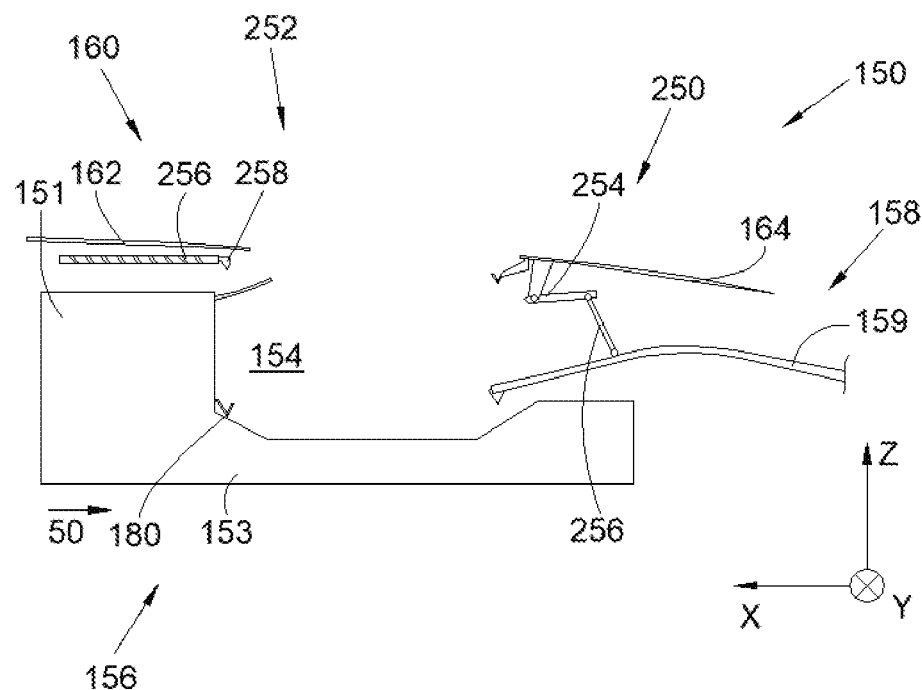
FIG. 6 is a view similar to that of FIG. 3, in a separated position.

FIGS. 5 and 6 correspond to the phases of maintenance of the turbine engine 150. From the forward position (FIG. 5), the lock 180 is unlocked and the hooping 258 is disengaged, which means to say that the internal cowls 159 are released from the engine 156 and that the cascades of vanes 256 are released from the outer cowl 164.

As the outer cowls 164 are moved from the forward position to the retracted position (FIG. 6), the internal cowls 159 also move towards the rear whereas the cascades of vanes 256 remain under the fan case 162. This makes it possible to free up access to the engine 156 without the need to remove the various cowls 159 and 164.

Each fan cowl is also fixed here to the pylon 152 via a pivot connection about the axis of rotation 177. The pivot connection is embodied by any suitable structure such as, for example, hinges.

In the disclosure herein embodiment depicted here, the lock 180 comprises, on the one hand, a slot which is open towards the outside, namely radially with respect to the longitudinal axis and the direction of translation, which extends around the engine 156 and is secured thereto and, on the other hand, for each internal cowl 159, a rib secured to the internal cowl 159 which is housed in the slot in the locking position and which leaves the slot in the unlocked position. When the lock 180 is in the locked position, the rib which is in the slot prevents the internal cowls 159 from moving parallel to the direction of translation. The rib is brought out of the slot by lifting the rib relative to the slot.

In the disclosure herein embodiment depicted here, the hooping 258 comprises, on the one hand, a slot which is open to the outside, namely radially with respect to the longitudinal axis and the direction of translation, which extends around the engine 156 and which is secured to the outer cowl 164 and, on the other hand, for each cascade of vanes 256, a rib secured to the cascade of vanes 256 which is housed in the slot in the hooping position and which leaves the slot in the disengaged position. When the hooping 258 is in the hooping position, the rib which is in the slot allows the cascade of vanes 256 and the outer cowl 164 to be secured to one another to ensure movements parallel to the direction of translation. The rib is moved out of the slot by lowering the slot towards the engine 156 with respect to the rib.

Figure 7:
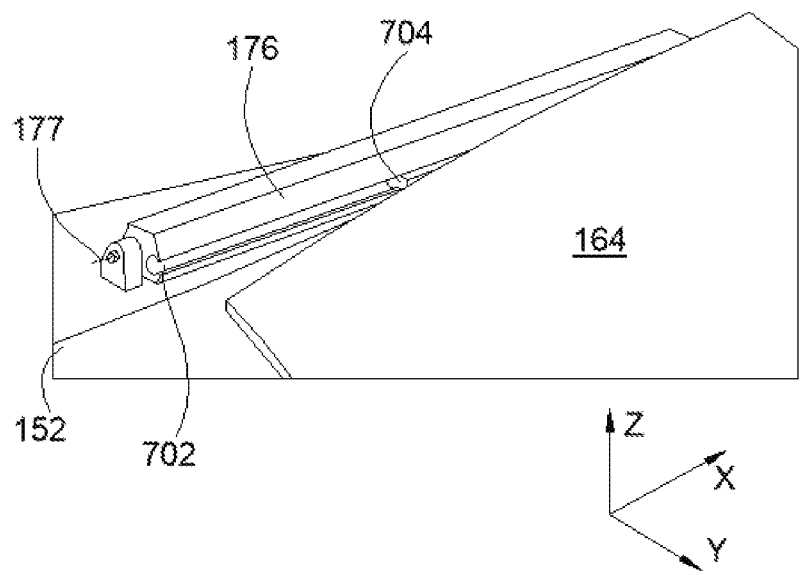
FIG. 7 is a perspective view of the system for translating the mobile cowl.

FIG. 7 shows the beam 176 mounted on the pylon 152 with its slot 702 and a slider 704 of the outer cowl 164 which slides in the slot 702 parallel to the direction of translation.

Figure 8:
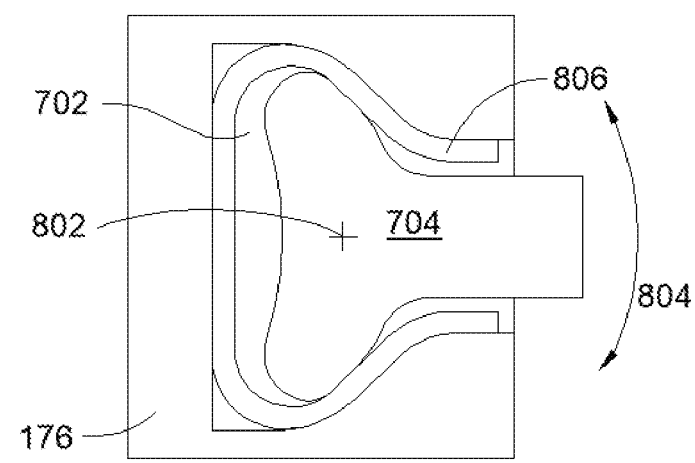
FIG. 8 is a front view of the connection between the mobile cowl and the translation system.

FIG. 8 shows a front view of the beam 176 in which each slider 704 of the outer cowl 164 has a degree of freedom in translational movement parallel to the direction of translation and a degree of freedom in rotational movement about an axis of travel 802 parallel to the direction of translation and different from the axis of rotation 177. What this means to say is that there is a sliding pivot connection between each slider 704 of the outer cowl 164 and the slot 702.

The angular travel (double arrow 804) of the corresponding pivot connection is limited and is, for example, of the order of +/−4 degrees. The angular travel is enough to allow the hooping 258 to be disengaged by moving the rib out of the slot.

The method for placing the propulsion system 100 in the maintenance position, namely for moving the outer cowl 164 and the internal cowl 159 towards the rear to make space for a technician working on the engine 156 involves first of all unlocking the first lock 180 and the hooping 258.

The method thus consists in or comprises:
moving the fan cowl and the outer cowl 164 from the closed position into the open position by rotation about the axis of rotation 177; this will cause the cascades of vanes 256 and the internal cowl 159 to move which will in turn cause the unlocking of the lock 180 by the rib leaving the slot,
moving the outer cowl 164 about the axis of travel 802 in order to dislodge the rib of the cascade of vanes 256 from the slot of the outer cowl 164 and thus bring about the disengagement of the hooping 258, this movement consisting in or comprising folding the outer cowl 164 down slightly towards the engine 156 by rotating about the axis of travel 802 in the direction from its open position towards its closed position, and
moving the outer cowl 164 and the internal cowl 159 towards the rear while the cascades of vanes 256 remain in position.

This method is applied on each side of the turbine engine 150.

In the disclosure herein embodiment set out in FIG. 8, the slider 704 has a kidney bean cross section and is housed in a slot 702 also having a kidney bean cross section but of greater dimensions.

The slider 704 and the slot 702 may have other cross-sectional shapes such as, for example, a circular cross section. It is sufficient for the dimensions of the slot 702 to be greater than the dimensions of the slider 704 to allow the rotation of the sliding pivot connection.

In the disclosure herein embodiment depicted in FIG. 8, the closed end of the slot 702 is covered with a profile section 806, particularly one made of metal and more particularly one made of aluminium. This profile section 806 makes it possible to improve the sliding of the slider 704 and to strengthen the beam 176. The internal surface of the profile section 806 in contact with the slider 806 may be covered with a slippery coating.

As explained above, the first mechanical transmission system may comprise for example actuators such as jacks, motors, etc.

Figure 9:
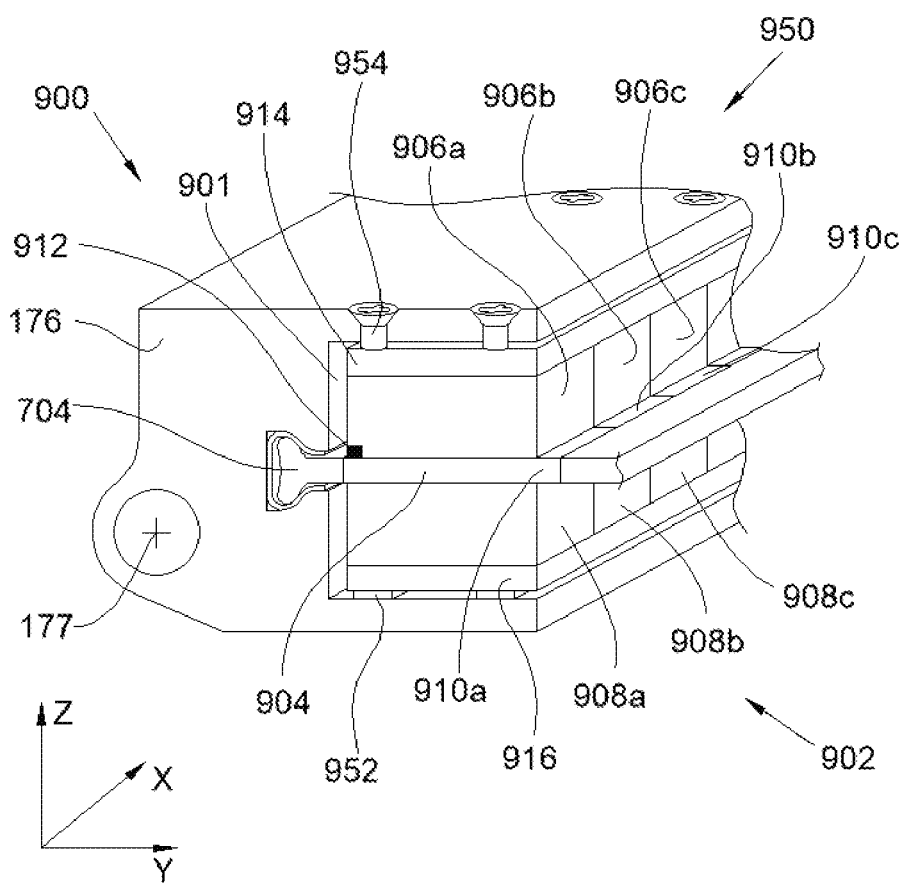
FIG. 9 is a perspective view of a motorised translation system.

FIG. 9 shows a particular embodiment of the first mechanical transmission system 900 which consists of or comprises a synchronous linear electric motor 902 and which is installed at the upper guideway connection 174. Such a linear electric motor 902 may also be installed at the bottom guideway connection 172 where the beam constitutes part of the internal cowl 159 and the guideway constitutes part of the outer cowl 164.

Each linear electric motor 902 comprises a first series of coils 906a-c aligned one after the other in the direction of translation.

Each linear electric motor 902 comprises a second series of coils 908a-c aligned one after the other in the direction of translation.

Each coil 908a-c of the second series faces a coil 906a-c of the first series.

Each beam 176 comprises an opening 901 extending parallel to the direction of translation and in which the first series of coils 906a-c and the second series of coils 908a-c are housed.

Each linear electric motor 902 also comprises a strip 904 which is incorporated into the slider 704 and which extends in the translation direction and is made up of a succession of permanent magnets 910a-c aligned one after the other in the direction of translation. The permanent magnets 910a-c are arranged between the first series and the second series of coils 906a-c, 908a-c. The permanent magnets 910a-c have their north pole alternately facing toward the first series of coils 906a-c and the second series of coils 908a-c. What that means to say is that when a permanent magnet 910a-c has its north pole facing towards the first series 906a-c and its south pole towards the second series 908a-c, the two adjacent permanent magnets 910a-c have their north poles facing toward the second series 908a-c and their south poles towards the first series 906a-c.

In the disclosure herein embodiment depicted in FIG. 9, for each series of coils 906a-c, 908a-c, the coils of the series are fixed to a support plate 914, 916 which is arranged on the opposite side to the slider 704.

The principle is to power the coils 906a-c and 908a-c of each series which face the permanent magnets 910a-c with alternating current and a suitable phase shift so as to generate a force that causes the slider 704 to move. Two coils facing one another (namely a coil 906*a-c* from the first series facing a coil 908*a-c* from the second series) are powered identically and therefore aligned identically.

To this end, each first mechanical transmission system 900 comprises a position sensor 912 which senses the position of the slider 704 along the direction of translation and therefore the position of the permanent magnets 910*a-c* with respect to the coils 906*a-c*, 908*a-c*. The position sensor 912 is, for example, a magnetic sensor which detects the change in magnetic field upon the passing of the permanent magnets 910*a-c* and therefore the distance travelled by the slider 704. From the information delivered by the position sensor 912, the control unit determines which coils 906*a-c*, 908*a-c* are facing a permanent magnet 910*a-c*.

An electric power supply is provided for powering each coil 906*a-c*, 908*a-c* and this is controlled by the control unit on the basis of the information delivered by the position sensor 912 so as to power only those coils 906*a-c*, 908*a-c* that are facing a permanent magnet 910*a-c*. The selective powering of the coils 906*a-c*, 908*a-c* allows the slider 704 to be moved in the direction of translation.

Each slider 704 may comprise a metallic portion (made up of a single conducting plate or of mutually parallel strands, arranged perpendicular to the path of the slider and connected to the ends) without a magnet in the continuation of the strip 904 in order to benefit from the eddy currents generated as the slider 704 moves and thus provide slowing of the slider 704 at the end of its travel.

The first mechanical transmission system 900 of the upper guideway connection 174 also comprises a blocking system 950 which may alternately adopt a blocking position in which the blocking system 950 blocks the two series of coils 906*a-c*, 908*a-c*, preventing any movement of the coils 906*a-c*, 908*a-c*, and a release position in which the blocking system 950 does not block the two series of coils 906*a-c*, 908*a-c*, allowing the coils 906*a-c*, 908*a-c* rotational movement about the axis of travel 802. This blocking system 950 thus makes it possible to free the outer cowl 164 to move about the axis of travel 802.

In the disclosure herein embodiment depicted in FIG. 9, the blocking system 950 comprises deformable runners 952, in this instance two of them, for example made of elastomer, and arranged between one series of coils, in this instance the second series of coils, 908*a-c*, and the beam 176. In the disclosure herein embodiment depicted here, the deformable runners 952 are more specifically positioned between the support plate 916 and the beam 176.

The blocking system 950 also comprises a press 954 positioned on the opposite side to the deformable runners 952 against the other series of coils, in this instance the first series of coils 906*a-c*. The press 954 may alternately adopt a pressing position in which they press on the other series of coils, in order to compress the deformable runners 952, or a relaxed position in which they do not press on the other series of coils, so as to relax the deformable runners 952.

The press 954 may for example be binding screws or electrical actuators such as electromagnets, jacks, etc.

The synchronous electric motor may be replaced by an asynchronous motor.

The orientation of the direction of translation will be dependent on the space available around the propulsion system 100. For example, the direction of translation may be at an angle close to 90° with respect to the vertical axis Z in order to keep the fan case 162 and the outer cowl 164 aligned in the retracted position. For example, the direction of translation may be at an angle close to 90° with respect to the transverse axis Y in order to escape the wing structure of the aircraft 10 during deployment.

According to one example, the control unit comprises, connected by a communication bus: a processor or CPU (Central Processing Unit), a Random Access Memory RAM, a Read Only Memory ROM, a storage unit such as a hard disk or a storage medium reader, such as an SD (Secure Digital) card reader; at least one communication interface allowing for example the control unit to communicate with the electrical power supply, the position sensor 912, the mechanical transmission systems.

The processor is capable of executing instructions loaded into the RAM from the ROM, from an external memory (not depicted), from a storage medium (such as an SD card) or from a communications network. When power is applied to the equipment, the processor is capable of reading instructions from the RAM and executing them. These instructions form a computer program causing the processor to implement all or some of the algorithms and steps described above.

All or some of the algorithms and steps described hereinafter may be implemented in software form by a programmable machine, for example a DSP (Digital Signal Processor) or a microcontroller, executing a series of instructions or may be implemented in hardware form by a dedicated machine or component, such as an FPGA (Field-Programmable Gate Array) or an ASIC (Application-Specific Integrated Circuit).

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion system for an aircraft comprising:
   a pylon;
   a bypass turbine engine comprising:
   an engine with a fan;
   two internal cowls surrounding the engine;
   a fan case;
   two outer cowls that surround the internal cowls to define a secondary flow path, are positioned to a rear of the fan case, and are movable in translation with respect to the engine between a forward position, in which the outer cowls are against the rear of the fan case, and a retracted position, in which the two outer cowls are distant from the fan case to open up a window between the secondary flow path and an outside;
   a lock, which can alternately adopt a locked position, in which the lock locks the internal cowls of the bypass turbine engine, and an unlocked position, in which the lock releases the internal cowls of the bypass turbine engine;
   at least one door for each of the outer cowls, wherein the at least one door is mounted with an ability to rotate on the outer cowl between a non-obstructing position, in which the door is not across the secondary flow path, and a deployed position, in which the door is across the secondary flow path to divert flow of air towards the window; and cascades of vanes fixed to the outer cowl via a hooping, which can alternately adopt a hooping position, in which the hooping locks the cascades of vanes to the outer cowl, and a disengaged position, in which the hooping releases the cascades of vanes from the outer cowl;

wherein each outer cowl is mounted with an ability to slide parallel to a direction of translation on a corresponding internal cowl via a top guideway connection and a bottom guideway connection;

wherein each outer cowl is mounted with an ability to slide parallel to a direction of translation on the pylon via an upper guideway connection;

wherein the upper guideway connection comprises a beam having a slot, at least one slider, which is secured to the outer cowl and slides in the slot, and at least one slider, which is secured to the cascades of vanes and slides in the slot; and wherein the beam is fixed to the pylon via a pivot connection about an axis of rotation, which is parallel to the direction of translation, to allow the outer cowl to move between a closed position, in which the outer cowl is closed up around the engine, and an open position, in which the outer cowl is distant from the engine; and a first mechanical transmission system at the upper guideway connection and a second mechanical transmission system at the bottom guideway connection with a beam constituting part of each one of the internal cowls and a slider constituting part of each one of the outer cowls.

2. The propulsion system according to claim 1, wherein:
the fan case is made up of two fan cowls, each of the two fan cowls being fixed to the pylon via a pivot connection pivoting about the axis of rotation allowing each fan cowl to move between the closed position and the open position;

the lock comprises a lock slot, which is open towards the outside and extends around and is secured to the engine;

each internal cowl comprises a lock rib, which is configured such that, in the locked position, the lock rib is secured in the lock slot, and, in the unlocked position, the lock rib comes out of the lock slot to allow the internal cowl associated with the lock rib to slide away from the engine;

the hooping comprises a hooping slot, which is open towards the outside, extends around the engine, and is secured to the outer cowl;

each cascade of vanes comprises a hooping rib, which is configured such that, in the hooping position, the hooping rib is secured in the hooping slot, and, in the disengaged position, the hooping rib comes out of the hooping slot to allow the outer cowl associated with the hooping rib to slide away from the cascade of vanes; and the connection between each slider of the outer cowl and the slot is a sliding pivot connection.

3. The propulsion system according to claim 1, wherein the beam of the upper guideway connection and the beam of the bottom guideway connection each comprise an opening which extends parallel to the direction of translation, wherein the first mechanical transmission system and the second mechanical transmission system each comprise:

a first series of coils aligned one after another in the direction of translation;

a second series of coils aligned one after another in the direction of translation, in which the first series of coils and the second series of coils are housed in the opening;

a strip which is incorporated into the slider, which extends in the direction of translation and which is made up of a succession of permanent magnets aligned one after another in the direction of translation, in which the permanent magnets are arranged between the first series and the second series of coils, in which two consecutive permanent magnets have their north pole facing alternately towards the first series of coils and towards the second series of coils;

a position sensor configured to sense position of the slider in the direction of translation;

an electrical power supply to power the coils; and a control unit configured to control electrical power supply according to information delivered by the position sensor to power only coils that are facing a permanent magnet; and the first mechanical transmission system of the upper guideway connection comprising a blocking system which can alternately adopt a blocking position in which the blocking system blocks the two series of coils, and a release position in which the blocking system does not block the two series of coils.

4. The propulsion system according to claim 3, wherein the blocking system comprises deformable runners positioned between a series of coils and the beam, and a press arranged on an opposite side to the deformable runners against the other series of coils, wherein the press is able alternately to adopt a pressing position, in which the press pushes against the other series of coils to compress the deformable runners, or a relaxed position, in which the press does not press on the other series of coils, so as to relax the deformable runners.

5. An aircraft comprising at least one propulsion system according to claim 1.

6. A method for placing a propulsion system in a maintenance position, the method comprising:
providing a propulsion system for an aircraft comprising:
a pylon;
a bypass turbine engine comprising:
an engine with a fan;
two internal cowls surrounding the engine;
a fan case;
two outer cowls that surround the internal cowls to define a secondary flow path, are positioned to a rear of the fan case, and are movable in translation with respect to the engine between a forward position, in which the outer cowls are against the rear of the fan case, and a retracted position, in which the two outer cowls are distant from the fan case to open up a window between the secondary flow path and an outside;
a lock, which can alternately adopt a locked position, in which the lock locks the internal cowls of the bypass turbine engine, and an unlocked position, in which the lock releases the internal cowls of the bypass turbine engine;
at least one door for each of the outer cowls, wherein the at least one door is mounted with an ability to rotate on the outer cowl between a non-obstructing position, in which the door is not across the secondary flow path, and a deployed position, in which the door is across the secondary flow path to divert flow of air towards the window; and cascades of vanes fixed to the outer cowl via a hooping, which can alternately adopt a hooping position, in which the hooping locks the cascades of vanes to the outer cowl, and a disengaged position, in which the hooping releases the cascades of vanes from the outer cowl;

wherein each outer cowl is mounted with an ability to slide parallel to a direction of translation on a corresponding internal cowl via a top guideway connection and a bottom guideway connection;

wherein each outer cowl is mounted with an ability to slide parallel to a direction of translation on the pylon via an upper guideway connection;

wherein the upper guideway connection comprises a beam having a slot, at least one slider, which is secured to the outer cowl and slides in the slot, and at least one slider, which is secured to the cascades of vanes and slides in the slot; and wherein the beam is fixed to the pylon via a pivot connection about an axis of rotation, which is parallel to the direction of translation, to allow the outer cowl to move between a closed position, in which the outer cowl is closed up around the engine, and an open position, in which the outer cowl is distant from the engine; and a first mechanical transmission system at the upper guideway connection and a second mechanical transmission system at the bottom guideway connection with a beam constituting part of each one of the internal cowls and a slider constituting part of each one of the outer cowls;

moving the fan cowl and the outer cowl from the closed position into the open position by rotation about the axis of rotation, the cascades of vanes and the internal cowl rotating with the fan cowl and the outer cowl;

unlocking the lock;

moving the outer cowl about the axis of rotation to dislodge a rib of the cascade of vanes from a slot in the outer cowl; and moving the outer cowl and the internal cowl towards the rear of the bypass turbine engine while the cascades of vanes remain in position adjacent to the fan case.

7. A propulsion system for an aircraft comprising:
a pylon; and
a bypass turbine engine comprising:
  an engine with a fan;
  two internal cowls surrounding the engine;
  a fan case;
  two outer cowls that surround the internal cowls to define a secondary flow path, are positioned to a rear of the fan case, and are movable in translation with respect to the engine between a forward position, in which the outer cowls are against the rear of the fan case, and a retracted position, in which the two outer cowls are distant from the fan case to open up a window between the secondary flow path and an outside;
  a lock, which can alternately adopt a locked position, in which the lock locks the internal cowls of the bypass turbine engine, and an unlocked position, in which the lock releases the internal cowls of the bypass turbine engine;
  at least one door for each of the outer cowls, wherein the at least one door is mounted with an ability to rotate on the outer cowl between a non-obstructing position, in which the door is not across the secondary flow path, and a deployed position, in which the door is across the secondary flow path to divert flow of air towards the window; and
  cascades of vanes fixed to the outer cowl via a hooping, which can alternately adopt a hooping position, in which the hooping locks the cascades of vanes to the outer cowl, and a disengaged position, in which the hooping releases the cascades of vanes from the outer cowl, wherein the hooping comprises a hooping slot, which is open towards the outside, extends around the engine, and is secured to the outer cowl, and wherein each cascade of vanes comprises a hooping rib, which is configured such that, in the hooping position, the hooping rib is secured in the hooping slot, and, in the disengaged position, the hooping rib comes out of the hooping slot to allow the outer cowl associated with the hooping rib to slide away from the cascade of vanes;
  wherein each outer cowl is mounted with an ability to slide parallel to a direction of translation on a corresponding internal cowl via a top guideway connection and a bottom guideway connection;
  wherein each outer cowl is mounted with an ability to slide parallel to a direction of translation on the pylon via an upper guideway connection;
  wherein the upper guideway connection comprises a beam having a slot, at least one slider, which is secured to the outer cowl and slides in the slot, and at least one slider, which is secured to the cascades of vanes and slides in the slot; and
  wherein the beam is fixed to the pylon via a pivot connection about an axis of rotation, which is parallel to the direction of translation, to allow the outer cowl to move between a closed position, in which the outer cowl is closed up around the engine, and an open position, in which the outer cowl is distant from the engine.

8. The propulsion system according to claim 7, wherein:
the fan case is made up of two fan cowls, each of the two fan cowls being fixed to the pylon via a pivot connection pivoting about the axis of rotation allowing each fan cowl to move between the closed position and the open position;
the lock comprises a lock slot, which is open towards the outside and extends around and is secured to the engine;
each internal cowl comprises a lock rib, which is configured such that, in the locked position, the lock rib is secured in the lock slot, and, in the unlocked position, the lock rib comes out of the lock slot to allow the internal cowl associated with the lock rib to slide away from the engine; and
the connection between each slider of the outer cowl and the slot is a sliding pivot connection.

9. The propulsion system according to claim 7, comprising a first mechanical transmission system at the upper guideway connection and a second mechanical transmission system at the bottom guideway connection with a beam constituting part of each one of the internal cowls and a slider constituting part of each one of the outer cowls.

10. The propulsion system according to claim 9, wherein the beam of the upper guideway connection and the beam of the bottom guideway connection each comprise an opening which extends parallel to the direction of translation, wherein the first mechanical transmission system and the second mechanical transmission system each comprise:

a first series of coils aligned one after another in the direction of translation;

a second series of coils aligned one after another in the direction of translation, in which the first series of coils and the second series of coils are housed in the opening;

a strip which is incorporated into the slider, which extends in the direction of translation and which is made up of a succession of permanent magnets aligned one after another in the direction of translation, in which the permanent magnets are arranged between the first series and the second series of coils, in which two consecutive permanent magnets have their north pole facing alternately towards the first series of coils and towards the second series of coils;

a position sensor configured to sense position of the slider in the direction of translation;

an electrical power supply to power the coils; and a control unit configured to control electrical power supply according to information delivered by the position sensor to power only coils that are facing a permanent magnet; and the first mechanical transmission system of the upper guideway connection comprising a blocking system which can alternately adopt a blocking position in which the blocking system blocks the two series of coils, and a release position in which the blocking system does not block the two series of coils.

11. The propulsion system according to claim 10, wherein the blocking system comprises deformable runners positioned between a series of coils and the beam, and a press arranged on an opposite side to the deformable runners against the other series of coils, wherein the press is able alternately to adopt a pressing position, in which the press pushes against the other series of coils to compress the deformable runners, or a relaxed position, in which the press does not press on the other series of coils, so as to relax the deformable runners.

* * * * *